Aug. 8, 1939.                L. MYERS                2,168,429
                            DRINK MIXER
                    Original Filed Sept. 24, 1936
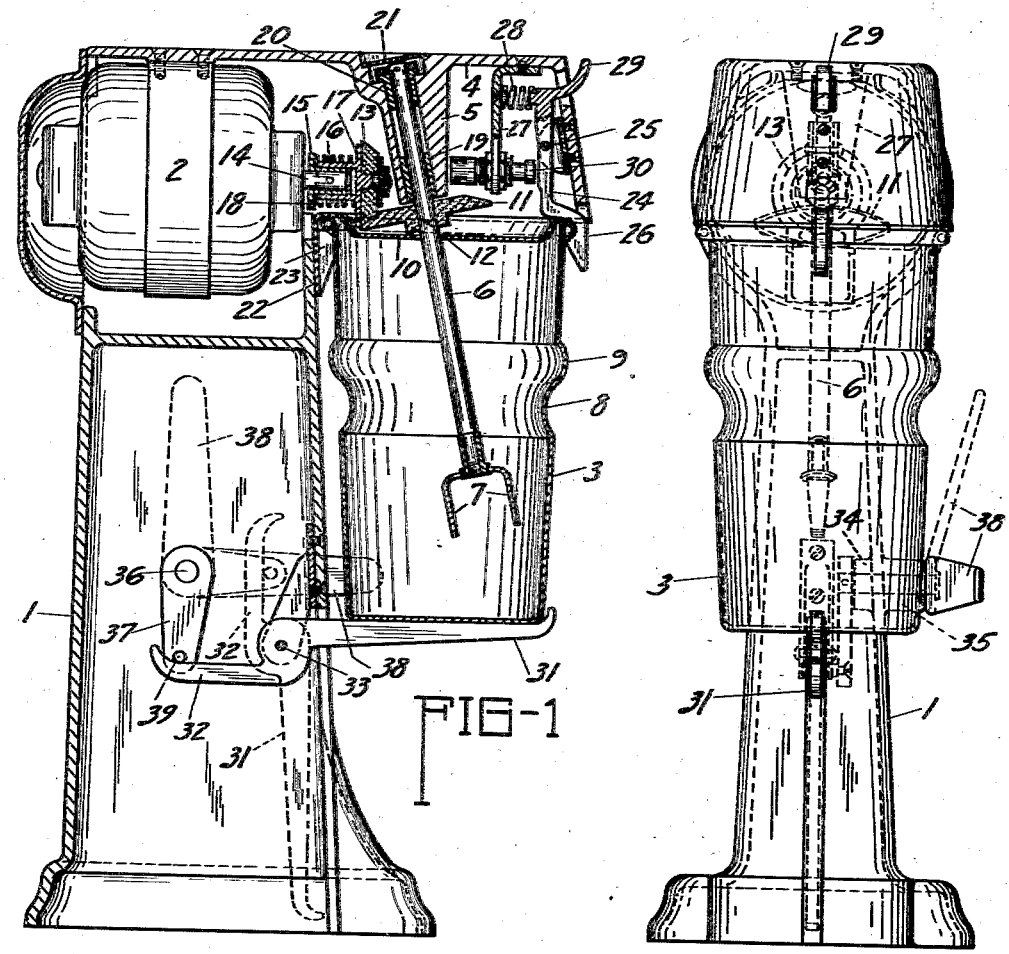
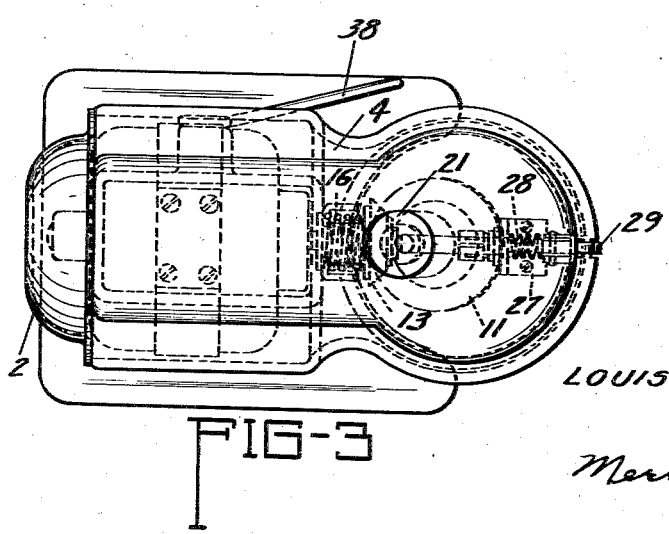
LOUIS MYERS  INVENTOR.
BY Merrill M. Blackburn
                ATTORNEY Patented Aug. 8, 1939

2,168,429

UNITED STATES PATENT OFFICE 2,168,429

DRINK MIXER

Louis Myers, Galesburg, Ill.

Application September 24, 1936, Serial No. 102,365
Renewed January 11, 1939

7 Claims. (Cl. 259—106)

The present invention pertains to various improvements in the construction of machines commonly referred to as drink mixers and comprises among its objects the provision of an improved arrangement for accomplishing the mixing of drinks; the provision of an improved cup to be used as a part of the drink mixer; to provide improved means for supporting the mixing cup in position for the agitation of beverages contained in the mixing cup; to provide an improved mechanism for turning on the current to the motor to cause driving thereof; and such further objects, advantages, and capabilities as will hereafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Fig. 1 represents an approximately central longitudinal section of a structure embodying my present invention;

Fig. 2 represents a front elevation of the structure disclosed in Fig. 1;

Fig. 3 represents a top plan view of this structure.

The present invention comprises a base 1, a motor 2, a mixing cup 3, supporting means for supporting the cup, and mixing means, actuated by the motor, for mixing the beverage in the cup. An overhang 4 is secured to the upper end of the base 1 and has the motor 2 secured thereto and housed between the overhang and the base. A depending post 5 projects downwardly from the overhang 4 and is bored for the reception of the shaft 6. A mixer head 7 is secured to the lower end of the shaft 6, which shaft extends downwardly and diagonally so that the mixer head will rotate in a direction between vertical and horizontal, thus causing a diagonal movement of the beverage with respect to the cup 3.

The cup is provided with a lower internally extending rib 8 and an upper outwardly extending rib 9, the purpose of which ribs is to secure a more thorough mixing of the beverage than would result from the use of a cup not provided with an internal projection comparable to the rib 8. The outward groove corresponding to the inward rib 8 cooperates with the outwardly extending rib 9 in forming an improved hand hold by means of which the mixing cup may be grasped by the user of the machine. Also, since modern cleaning machinery is all rotary, the transverse arrangement of the ribs makes cleaning much easier and more thorough. The cup 3 has a cap 10 against which the upper edge of the cup is pressed when ready for use and which serves as a closure for the cup during the operation of the machine, thus preventing splashing of the beverage while the mixer is operating. The shaft 6 extends through an opening in the cap 10, as is clear from Fig. 1.

A friction disc 11 is secured to the shaft 6, as by means of a pin 12. This friction disc 11 cooperates with a friction disc 13 connected by suitable means to the motor shaft 14. A flanged sleeve 15 surrounds the shaft 14 and this is in turn surrounded by a sleeve 16 having a flange 17 which serves as a backing for the friction disc 13. A screw-threaded stud projects from the face of the disc of which the flange 17 forms a part, and this stud has the disc 13 secured thereon by means of a nut, as shown clearly in Fig. 1. A spring 18 surrounds the two sleeves and, at its opposite ends, bears against the flange of the sleeve 15 and the flange 17. A pin passes through the shaft 14 and through slots in the sleeves 15 and 16, thus permitting a certain amount of reciprocation of the outer sleeve with relation to the inner sleeve, the tendency of the spring 18 being to hold the disc 13 against the disc 11, in this way compensating for any wear which may take place and holding the two discs in driving engagement.

A sleeve 19 surrounds the shaft 6 and is located inside of the lower end of the post 5, furnishing a bearing for the shaft 6. A sleeve 20, flanged at its upper end, surrounds the shaft 6 and has its flange located in a concavity in the upper surface of the overhang, the concavity being closed by a disc 21. A pin through the upper end of the shaft 6 prevents this shaft from slipping with relation to the sleeves 19 and 20. The cap 10 has a projection formed upon one edge, which projection is turned down to form a bracket 22 by means of which the cap is secured to and supported upon the base 1. A pair of lugs or projections 23 are bent inwardly from the edge of the bracket 22 and give lateral support to the cup 3 to prevent same from sliding or rolling out of position. These lugs 23 also engage below the beaded rim of the cup and furnish supporting means to prevent the cup from dropping out of position.

A lever 24 is pivoted at 25 to the overhang 4 and is provided at its lower end with a hook 26 which engages the beaded rim of the cup and cooperates with the lugs 23 in holding the cup in position. A bracket 27 is supported from the overhang 4 and has a lug projecting from one face. A spring 28 surrounds this lug and a lug projecting from the adjacent face of the lever 24 and furnishes means for turning the lever about its pivot 25. A finger piece 29 furnishes means for turning the lever in the opposite direction. A switch 30 is mounted in the lower end of bracket 27 and is engaged by the lever 24 when the latter is permitted to swing inwardly, upon removal of the cup 3. Pressure of the lever 24 against the end of switch member 30 causes same to have reciprocatory motion, resulting in the switch being opened, thus breaking the circuit to the motor 2.

A lever 31 having an arm 32 is pivoted at 33 to the base 1 and may swing from the solid line position, shown in Fig. 1, to the dotted line position, shown therein. Formed upon opposite sides of a lateral wall of the base 1, as shown in dotted lines in Fig. 2, are bosses 34 and 35 which furnish a bearing for a shaft 36 passing therethrough. At the two ends of this shaft are crank arms 37 and 38, the crank arms and shaft together forming a bell crank lever by means of which the lever 31 may be actuated. A pin 39 projects from the crank arm 37 and contacts with a face of the extension 32 to transmit force from the bell crank to the lever 31 which may be used either in conjunction with upper holding means, to hold the cup in place, or independently thereof.

If the supporting arm 31 is not used in supporting the cup 3, the rim of the latter is inserted between the cap 10 and the lugs 23 and the opposite edge of the cup rim is inserted inside of the hook 26 and the hook is permitted to press against the rim and hold the cup suspended under the cap. When the lever 24 is turned upon its pivot 25, in inserting the cup 3, the switch is permitted to close and the motor 2 starts operating, thus rotating the agitator unit 7 within the cup and causing mixing of the drink within the cup. If desired, the crank arm 38 may be turned from its upper position, shown in dotted lines, to the solid line position shown in the drawing, and the supporting arm 31 is then positioned to support the cup 3 against the cap 10. If the spring 28 is not made with sufficient strength to cause the lever 24 to support the cup, then it will be desirable to use the supporting arm 31 to sustain the cup and its contents. Also, if the lever 24 is not provided with a hook 26 but with merely a cam face projection upon which the rim of the cup slides to move the lever out of the way so as to permit closure of the switch 30, then the supporting arm 31 is needed. It is therefore apparent that this device may be used either with or without the upper supporting means.

It is of course understood that the specific description of structure set forth above may be departed from without departing from the spirit of my invention as set forth in this specification and the appended claims.

Having now described my invention, I claim:

1. In a drink mixer, the combination with an inclined stirrer, tending to produce in fluids being mixed a diagonally upward motion, of a cup having a portion of its lateral wall pressed inwardly to form a transverse internal rib to assist in the mixing of materials placed in the cup.

2. In a drink mixer, a cup having a portion of its lateral wall pressed inwardly to form a transverse internal rib to assist in the mixing of materials placed in the cup, and a transverse external rib adjacent the internal rib to assist in providing a finger hold for the handling of the cup, in combination with an inclined stirrer tending to produce in fluids being mixed a diagonally upward motion.

3. In a drink mixer, a supporting base unit, a cap secured adjacent to the upper end of said unit, said cap having a pair of laterally spaced projections to be engaged by an external bead on the side wall of a mixing cup to assist in holding the cup in position, a hook pivotally mounted in the upper part of the base unit to engage said external bead of the mixing cup and assist in holding the cup in place, and a supporting arm pivotally mounted in the central portion of the supporting base and arranged to swing out into a position beneath a mixing cup to support the same, said supporting arm having an extension projecting transversely of the supporting base when in cup-supporting position, said structure being provided with a crank to engage said extension and cause rotation of the supporting arm around its pivot into and out of supporting position.

4. In a drink mixer, an upright supporting base having at its upper end an overhang for the support of a mixing unit, a lever pivoted upon said overhang and projecting downwardly to engage the edge of a mixing cup, said lever having at its lower end a hook for engagement with the rim of the mixing cup and at its upper end a fingerpiece for actuation of the lever, and a spring to actuate said lever so that said hook will engage the cup rim, and said base having projections to engage the side of the cup opposite said hook and cooperate therewith in supporting the cup.

5. In a drink mixer, an upright supporting base having at its upper end an overhang for the support of a mixing unit, a lever pivoted upon said overhang and projecting downwardly to engage the edge of a mixing cup, said lever having at its lower end a hook for engagement with the rim of the mixing cup, a spring to actuate said lever so that said hook will engage the cup rim, said base having projections to engage the side of the cup opposite said hook and cooperate therewith in supporting the cup, a supporting means projecting from the overhang, and a switch supported by said means in the path of movement of said lever so that when the cup is removed from the base the lever will engage and press against the switch to cause opening thereof.

6. In a drink mixer, a supporting base unit, a cap secured adjacent to the upper end of said unit, and a supporting arm pivotally mounted in the central portion of the supporting base and arranged to swing out into a position beneath a mixing cup to support the same, said supporting arm, in non-operative position, being substantially concealed within the base.

7. In a drink mixer, a supporting base unit, a cap secured adjacent to the upper end of said unit, and a supporting arm pivotally mounted in the central portion of the supporting base and arranged to swing out into a position beneath a mixing cup to support the same, said arm receding into the base when in inoperative position.

LOUIS MYERS.